(12) United States Patent
Craig et al.

(10) Patent No.: US 11,813,706 B2
(45) Date of Patent: Nov. 14, 2023

(54) METHODS FOR FORMING COOLING APERTURES IN A TURBINE ENGINE COMPONENT

(71) Applicant: Raytheon Technologies Corporation, Farmington, CT (US)

(72) Inventors: Brian Craig, Palm Beach Gardens, FL (US); James M. Koonankeil, Marlborough, CT (US); Brian T. Hazel, Avon, CT (US); Paul E. Denney, Northborough, MA (US); Dominic J. Mongillo, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/401,947

(22) Filed: Aug. 13, 2021

(65) Prior Publication Data

US 2023/0049566 A1 Feb. 16, 2023

(51) Int. Cl.
*B23P 15/00* (2006.01)

(52) U.S. Cl.
CPC ........... *B23P 15/00* (2013.01); *B23P 2700/06* (2013.01); *F05D 2220/30* (2013.01); *F05D 2230/90* (2013.01); *F05D 2260/20* (2013.01)

(58) Field of Classification Search
CPC .. B23P 15/00; B23P 2700/06; F05D 2220/30; F05D 2230/90; F05D 2260/20
See application file for complete search history.

(56) References Cited

U.S. PATENT DOCUMENTS

| | | |
|---|---|---|
| 4,762,464 A | 8/1988 | Vertz |
| 6,234,755 B1 | 5/2001 | Bunker |
| 6,307,175 B1 | 10/2001 | Bloechlinger |
| 6,368,060 B1 | 4/2002 | Fehrenbach |
| 6,420,677 B1 | 7/2002 | Emer |
| 6,663,919 B2 | 12/2003 | Farmer |
| 6,909,800 B2 | 6/2005 | Vaidyanathan |
| 7,019,257 B2 | 3/2006 | Stevens |
| 7,041,933 B2 | 5/2006 | Forrester |
| 7,328,580 B2 | 2/2008 | Ching-Pang |
| 7,820,267 B2 | 10/2010 | Fahndrich |
| 7,964,087 B2 | 6/2011 | Lee |
| 7,997,868 B1 | 8/2011 | Liang |

(Continued)

FOREIGN PATENT DOCUMENTS

| | | |
|---|---|---|
| CN | 111665806 A | 9/2020 |
| EP | 985802 A | 3/2000 |

(Continued)

OTHER PUBLICATIONS

EP search report for EP22190422.0 dated Jan. 27, 2023.

*Primary Examiner* — Ryan J. Walters
(74) *Attorney, Agent, or Firm* — GETZ BALICH LLC

(57) ABSTRACT

A manufacturing method is provided during which a preform component for a turbine engine is provided. The preform component includes a substrate. An outer coating is applied over the substrate. A characteristic of the outer coating is determined. Instructions for forming a cooling aperture are revised based on the characteristic of the outer coating to provide revised instructions. The cooling aperture is formed in the outer coating and the substrate based on the revised instructions.

19 Claims, 8 Drawing Sheets

(56) References Cited

U.S. PATENT DOCUMENTS

| | | |
|---|---|---|
| 8,057,181 B1 | 11/2011 | Liang |
| 8,157,526 B2 | 4/2012 | Beck |
| 8,168,912 B1 | 5/2012 | George |
| 8,245,519 B1 | 8/2012 | Liang |
| 8,672,613 B2 | 3/2014 | Bunker |
| 8,814,500 B1 | 8/2014 | George |
| 8,905,713 B2 | 12/2014 | Bunker |
| 9,468,991 B2 | 10/2016 | McDowell |
| 9,518,317 B2 | 12/2016 | Eminoglu |
| 9,598,979 B2 | 3/2017 | Reed |
| 9,650,900 B2 | 5/2017 | Malak |
| 9,696,035 B2 | 7/2017 | Starkweather |
| 9,765,623 B2 | 9/2017 | Kottilingam |
| 9,945,233 B2 | 4/2018 | Tanaka |
| 10,006,293 B1 | 6/2018 | Jones |
| 10,113,433 B2 | 10/2018 | Morris |
| 10,208,602 B2 | 2/2019 | Thornton |
| 10,280,763 B2 | 5/2019 | Torkaman |
| 10,350,684 B2 | 7/2019 | Bunker |
| 10,619,499 B2 | 4/2020 | Kottilingam |
| 10,815,796 B2 | 10/2020 | Burd |
| 11,603,769 B2 * | 3/2023 | Craig .................. B23K 26/386 |
| 2005/0092725 A1 | 5/2005 | Byrd |
| 2006/0229759 A1 | 10/2006 | Luketic |
| 2007/0241084 A1 * | 10/2007 | Hoebel ................ B23K 26/389 |
| | | 219/121.71 |
| 2008/0298920 A1 | 12/2008 | Janssen |
| 2009/0169394 A1 | 7/2009 | Crow |
| 2009/0248355 A1 | 10/2009 | Kriegmair |
| 2010/0282721 A1 | 11/2010 | Bunker |
| 2012/0102959 A1 | 5/2012 | Starkweather |
| 2012/0167389 A1 | 7/2012 | Lacy |
| 2012/0205355 A1 | 8/2012 | Münzer |
| 2014/0271129 A1 | 9/2014 | Mueller |
| 2015/0160644 A1 * | 6/2015 | Reid ..................... G05D 7/0617 |
| | | 29/402.19 |
| 2015/0190890 A1 * | 7/2015 | Ozturk ............... B23K 15/0013 |
| | | 408/1 R |
| 2015/0258634 A1 * | 9/2015 | Basdere .................. F01D 5/005 |
| | | 29/889.71 |
| 2015/0369059 A1 | 12/2015 | Burd |
| 2016/0356498 A1 | 12/2016 | Gerendas |
| 2017/0089579 A1 | 3/2017 | Bunker |
| 2017/0261208 A1 | 9/2017 | Starkweather |
| 2017/0320163 A1 | 11/2017 | Hu |
| 2017/0335691 A1 | 11/2017 | Crites |
| 2019/0085705 A1 | 3/2019 | Webster |
| 2019/0101004 A1 | 4/2019 | Rudolph |
| 2019/0106994 A1 | 4/2019 | Ng |
| 2019/0134752 A1 | 5/2019 | Grafton-Reed |
| 2020/0190990 A1 | 6/2020 | Hohenstein |
| 2020/0217207 A1 | 7/2020 | Loebig |
| 2021/0060709 A1 | 3/2021 | Thayer |
| 2022/0001500 A1 * | 1/2022 | Rahman ................ F23R 3/002 |

FOREIGN PATENT DOCUMENTS

| | | |
|---|---|---|
| EP | 1967696 B1 | 3/2017 |
| EP | 2886798 B1 | 10/2018 |
| GB | 2389330 B | 5/2004 |
| WO | 2020068130 A1 | 4/2020 |

* cited by examiner

METHODS FOR FORMING COOLING APERTURES IN A TURBINE ENGINE COMPONENT

BACKGROUND OF THE DISCLOSURE

1. Technical Field

This disclosure relates generally to a turbine engine and, more particularly, to cooling apertures and formation thereof in a component of the turbine engine.

2. Background Information

A gas turbine engine includes various fluid cooled components such as turbine blades and turbine vanes. Such fluid cooled components may include one or more cooling apertures extending through a sidewall of the respective component. Various methods are known in the art for forming cooling apertures. While these known cooling aperture formation methods have various benefits, there is still room in the art form improvement.

SUMMARY OF THE DISCLOSURE

According to an aspect of the present disclosure, a manufacturing method is provided during which a preform component for a turbine engine is provided. The preform component includes a substrate. An outer coating is applied over the substrate. A characteristic of the outer coating is determined. Instructions for forming a cooling aperture are revised based on the characteristic of the outer coating to provide revised instructions. The cooling aperture is formed in the outer coating and the substrate based on the revised instructions.

According to another aspect of the present disclosure, another manufacturing method is provided during which a preform component for a turbine engine is provided. The preform component includes a substrate. An outer coating is applied over the substrate. A design specification for a cooling aperture is adapted based on a characteristic of the outer coating. The cooling aperture is formed in the outer coating and the substrate based on the adapted design specification.

According to still another aspect of the present disclosure, another manufacturing method is provided during which a preform component for a turbine engine is provided. The preform component includes a substrate. An outer coating is applied over the substrate. A thickness of the outer coating applied over the substrate is determined. Instructions for forming a diffuser section of a cooling aperture are adapted based on the thickness of the outer coating to provide revised instructions. The diffuser section of the cooling aperture is formed at least in the outer coating based on the revised instructions.

The adapting of the design specification may change a value of a dimension for the cooling aperture.

The adapting of the design specification may change a geometry of the cooling aperture.

The adapting of the design specification may change a spatial orientation of the cooling aperture.

The method may also include determining the characteristic of the outer coating using artificial intelligence, machine learning and/or an imaging system.

The characteristic of the outer coating may be or otherwise include a thickness of the outer coating.

The characteristic of the outer coating may be or otherwise include a surface topology of the outer coating.

The cooling aperture may include a diffuser section and a meter section. The diffuser section may be formed at least in the outer coating. The meter section may be formed in the substrate.

The instructions may specify a dimension of the diffuser section to have a first value. The revised instructions may specify the dimension of the diffuser section to have a second value that is different the first value.

The instructions may specify a dimension of the meter section to have a first value. The revised instructions may specify the dimension of the meter section to have a second value that is different the first value.

At least a portion of the diffuser section and at least a portion of the meter section may be formed using a common machining process.

At least a portion of the diffuser section may be formed using a first machining process. At least a portion of the meter section may be formed using a second machining process that is different than the first machining process.

The characteristic of the outer coating may be determined using artificial intelligence.

The characteristic of the outer coating may be determined using machine learning.

The method may also include: scanning the substrate using an imaging system to provide substrate data prior to the applying of the outer coating; and scanning the outer coating using the imaging system to provide outer coating data. The determining of the characteristic of the outer coating may include comparing the coating data with the substrate data.

The determining of the characteristic of the outer coating may include scanning the outer coating with an imaging system to determine an internal structural feature of the outer coating.

The preform component may be configured as or otherwise include a preform of an airfoil for the turbine engine.

The preform component may be configured as or otherwise include a preform of a flowpath wall for the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for manufacturing fluid cooled components of a gas turbine engine. For ease of description, the turbine engine may be described below as a turbofan turbine engine. The present disclosure, however, is not limited to such an exemplary gas turbine engine. The turbine engine, for example, may alternatively be configured as a turbojet turbine engine, a turboprop turbine engine, a turboshaft turbine engine, a propfan turbine engine, a pusher fan turbine engine or an auxiliary power unit (APU) turbine engine. The turbine engine may be configured as a geared turbine engine or a direct drive turbine engine. The present disclosure is also not limited to aircraft applications. The turbine engine, for example, may alternatively be configured as a ground-based industrial turbine engine for power generation, or any other type of turbine engine which utilizes fluid cooled components.

Figure 1:
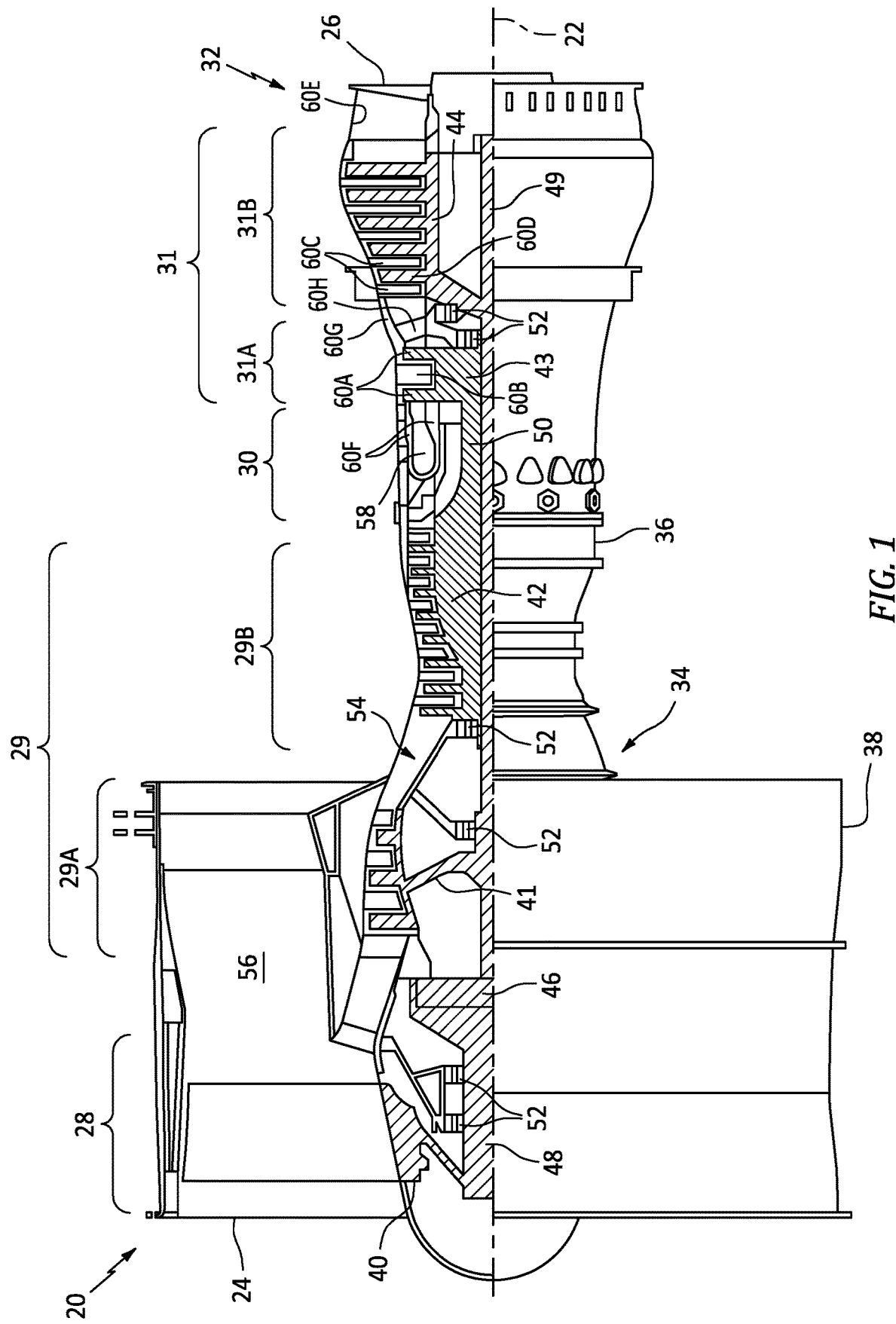
FIG. 1 is a side cutaway illustration of a geared turbofan turbine engine.

FIG. 1 is a side cutaway illustration of the turbofan turbine engine 20. This turbine engine 20 extends along an axial centerline 22 between a forward, upstream airflow inlet 24 and an aft, downstream airflow exhaust 26. The turbine engine 20 includes a fan section 28, a compressor section 29, a combustor section 30, a turbine section 31 and an exhaust section 32 (partially shown in FIG. 1). The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., an engine core. The outer case 38 may house at least the fan section 28.

Each of the engine sections 28, 29A, 29B, 31A and 31B includes a respective rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a gear train 46, for example, through a fan shaft 48. The gear train 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the turbine engine 20 through the airflow inlet 24. This air is directed through the fan section 28 and into a core flowpath 54 and a bypass flowpath 56. The core flowpath 54 extends sequentially through the engine sections 29A-32. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which propels bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

The turbine engine 20 includes a plurality of fluid cooled components (e.g., 60A-H; generally referred to as "60") arranged within, for example, the combustor section 30, the turbine section 31 and/or the exhaust section 32. Examples of these fluid cooled components 60 include airfoils such as, but not limited to, a rotor blade airfoil (e.g., 60A, 60D) and a stator vane airfoil (e.g., 60B, 60C, 60H). Other examples of the fluid cooled components 60 include flowpath walls such as, but not limited to, a combustor wall (e.g., 60F), an exhaust duct wall (e.g., 60E), a shroud or other flowpath wall (e.g., 60G), a rotor blade platform and a stator vane platform. Of course, various other fluid cooled components may be included in the turbine engine 20, and the present disclosure is not limited to any particular types or configurations thereof.

Figure 2:
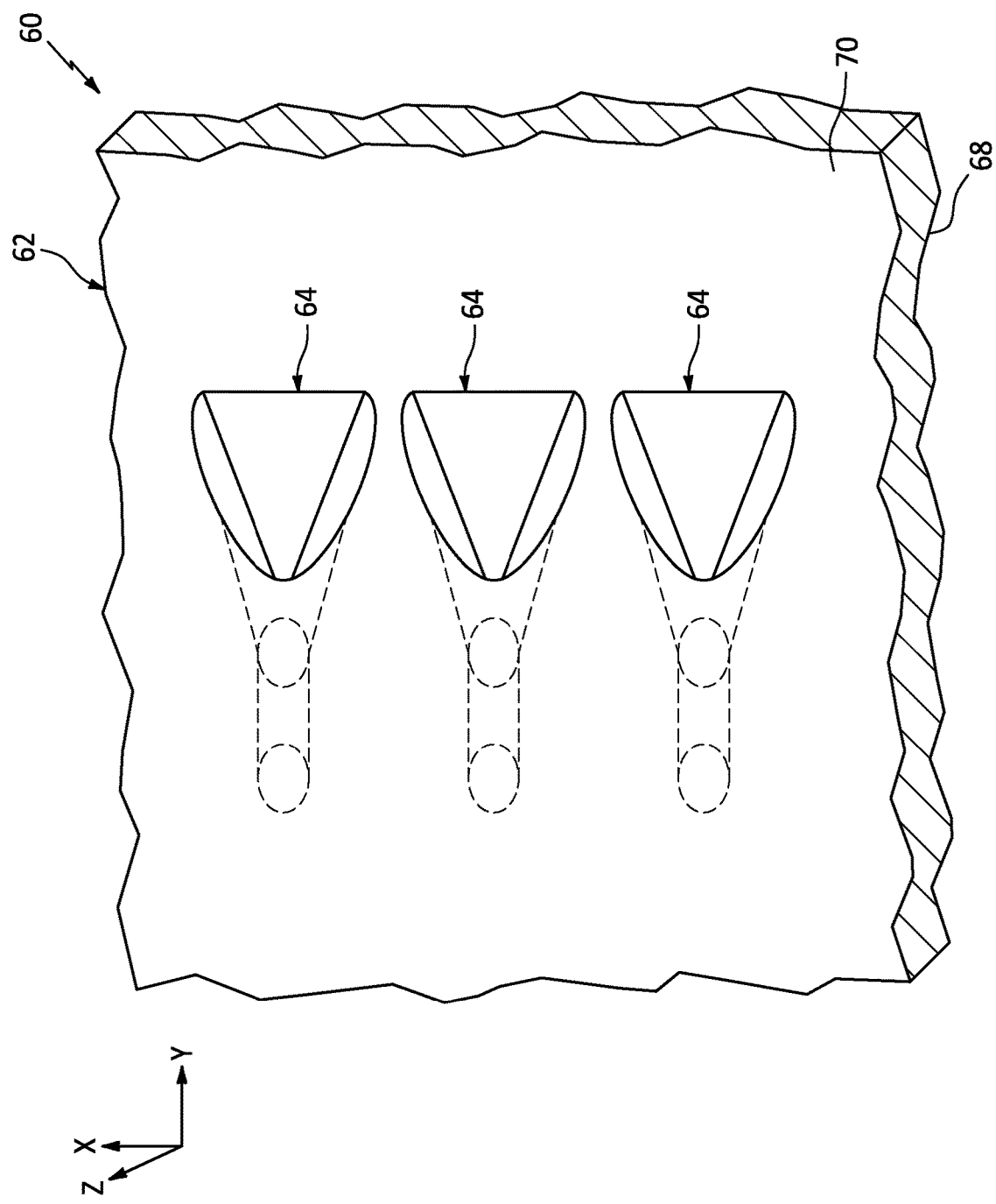
FIG. 2 is a perspective illustration of a portion of a fluid cooled component.

FIG. 2 illustrates a portion of one of the fluid cooled components 60 within the turbine engine 20. This fluid cooled component 60 has a component wall 62 (e.g., a sidewall or an endwall) configured with one or more cooling apertures 64.

Figure 3:
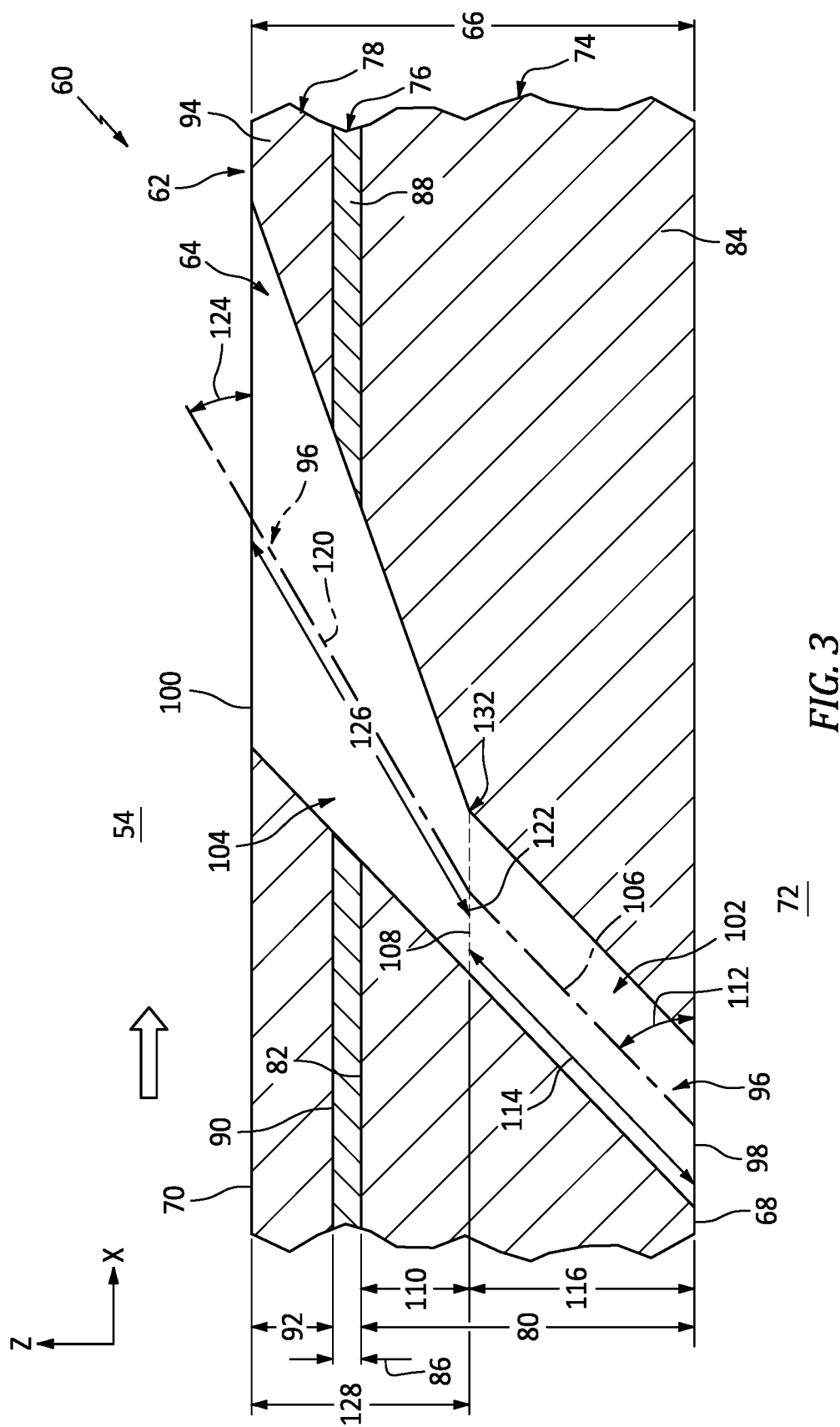
FIG. 3 is a sectional illustration of a portion of the fluid cooled component taken along a centerline of a cooling aperture.

Referring to FIG. 3, the component wall 62 has a thickness 66 that extends vertically (e.g., along a z-axis) between and to a first surface 68 and a second surface 70. The component first surface 68 may be configured as an interior and/or a cold side surface of the component wall 62. The component first surface 68, for example, may at least partially form a peripheral boundary of a cooling fluid volume 72 (e.g., a cavity or a passage) along the component wall 62. The component first surface 68 may thereby be subject to relatively cool fluid (e.g., cooling air) supplied to the cooling fluid volume 72. This cooling fluid volume 72 may be an internal volume formed within the fluid cooled component 60 where, for example, the component is an airfoil. Alternatively, the cooling fluid volume 72 may be an external volume formed external to the fluid cooled component 60 where, for example, the component is a flowpath wall. The component second surface 70 may be configured as an exterior and/or a hot side surface of the component wall 62. The component second surface 70, for example, may at least partially form a peripheral boundary of a portion of, for example, the core flowpath 54 along the component wall 62. The component second surface 70 may thereby be subject to relative hot fluid (e.g., combustion products) flowing through the core flowpath 54 within, for example, one of the engine sections 30-32 of FIG. 1.

The component wall 62 of FIG. 3 includes a component substrate 74 and one or more external component coatings 76 and 78. The component substrate 74 at least partially or completely forms and carries the component first surface 68. The component substrate 74 has a thickness 80 that extends vertically (e.g., along the z-axis) between and to the component first surface 68 and a second surface 82 of the component substrate 74. This substrate second surface 82 may be configured as an exterior surface of the component substrate 74 prior to being (e.g., partially or completely) covered by the one or more component coatings 76 and 78. The substrate thickness 80 may be greater than one-half (½) of the wall thickness 66. The substrate thickness 80, for example, may be between two-third (⅔) and four-fifths (⅘) of the wall thickness 66.

The component substrate 74 is constructed from substrate material 84. This substrate material 84 may be an electrically conductive material. The substrate material 84, for example, may be or otherwise include metal. Examples of the metal include, but are not limited to, nickel (Ni), titanium (Ti), aluminum (Al), chromium (Cr), cobalt (Co), and alloys thereof. The metal, for example, may be a nickel or cobalt based superalloy such as, but not limited to, PWA 1484 or PWA 1429.

The inner coating 76 may be configured as a bond coating between the component substrate 74 and the outer coating 78. The inner coating 76 of FIG. 3 is bonded (e.g., directly) to the substrate second surface 82. The inner coating 76 at least partially or completely covers the substrate second surface 82 (e.g., along an x-y plane of FIG. 2). The inner coating 76 has a thickness 86 that extends vertically (e.g., along the z-axis) between and to component substrate 74 and the outer coating 78. This inner coating thickness 86 may be less than one-seventh (⅐) of the wall thickness 66. The inner coating thickness 86, for example, may be between one-eighth (⅛) and one-fortieth (1/40) of the wall thickness 66.

The inner coating 76 is constructed from inner coating material 88. This inner coating material 88 may be an electrically conductive material. The inner coating material 88, for example, may be or otherwise include metal. Examples of the metal include, but are not limited to, MCrAlY and MAlCrX, where "M" is nickel (Ni), cobalt (Co), iron (Fe) or any combination thereof, and where "Y" or "X" is hafnium (Hf), yttrium (Y), silicon (Si) or any combination thereof. The MCrAlY and MAlCrX may be further modified with strengthening elements such as, but not limited to, tantalum (Ta), rhenium (Re), tungsten (W), molybdenum (Mo) or any combination thereof. An example of the MCrAlY is PWA 286.

The inner coating 76 may be formed from a single layer of the inner coating material 88. The inner coating 76 may alternatively be formed from a plurality of layers of the inner coating material 88, where the inner coating material 88 within each of those inner coating layers may be the same as one another or different from one another.

The outer coating 78 may be configured as a protective coating for the component substrate 74 and, more generally, the fluid cooled component 60. The outer coating 78, for example, may be configured as a thermal barrier layer and/or an environmental layer. The outer coating 78 at least partially or completely forms and carries the component second surface 70. The outer coating 78 of FIG. 2 is bonded (e.g., directly) to a second (e.g., exterior) surface 90 of the inner coating 76. The outer coating 78 at least partially or completely covers the inner coating second surface 90 as well as the underlying substrate second surface 82 (e.g., along an x-y plane of FIG. 2). The outer coating 78 has a thickness 92 that extends vertically (e.g., along the z-axis) between and to the inner coating 76 and the component second surface 70. This outer coating thickness 92 may be less than one-half (½) of the wall thickness 66. The outer coating thickness 92, for example, may be between one-third (⅓) and one-eighth (⅛) of the wall thickness 66. The outer coating thickness 92, however, may be greater than the inner coating thickness 86.

The outer coating 78 is constructed from outer coating material 94. This outer coating material 94 may be a non-electrically conductive material. The outer coating material 88, for example, may be or otherwise include ceramic. Examples of the ceramic include, but are not limited to, yttria stabilized zirconia (YSZ) and gadolinium zirconate (GdZ). The outer coating material 94 of the present disclosure is not limited to non-electrically conductive materials. In other embodiments, for example, the outer coating material 94 may be an electrically conductive material; e.g., metal.

The outer coating 78 may be formed from a single layer of the outer coating material 94. The outer coating 78 may alternatively be formed from a plurality of layers of the outer coating material 94, where the outer coating material 94 within each of those outer coating layers may be the same as one another or different from one another. For example, the outer coating 78 may include a thin interior layer of the YSZ and a thicker exterior later of the GdZ.

Each of the cooling apertures 64 extends along a respective longitudinal centerline 96 between and to an inlet 98 of the respective cooling aperture 64 and an outlet 100 of the respective cooling aperture 64. The cooling aperture inlet 98 of FIG. 3 is located in the component first surface 68. The cooling aperture inlet 98 thereby fluidly couples its respective cooling aperture 64 with the cooling fluid volume 72 along the component first surface 68. The cooling aperture outlet 100 of FIG. 3 is located in the component second surface 70. The cooling aperture outlet 100 thereby fluidly couples its respective cooling aperture 64 with the core flowpath 54 along the component second surface 70.

Each of the cooling apertures 64 may include a meter section 102 and a diffuser section 104. The meter section 102 is disposed at (e.g., on, adjacent or proximate) the cooling aperture inlet 98. The meter section 102 is configured to meter (e.g., regulate) a flow of cooling fluid flowing from the cooling fluid volume 72, through the substrate material 84, to the diffuser section 104. The diffuser section 104 is disposed at the cooling aperture outlet 100. The diffuser section 104 is configured to diffuse the cooling fluid exhausted (e.g., directed out) from the cooling aperture outlet 100 into, for example, a film for cooling a downstream portion of the component second surface 70.

The meter section 102 of FIG. 3 extends longitudinally along the longitudinal centerline 96 within (e.g., partially into) the component substrate 74. More particularly, the meter section 102 extends longitudinally along a meter segment 106 of the longitudinal centerline 96 (e.g., a centerline of the meter section 102) from the cooling aperture inlet 98 to an outlet 108 of the meter section 102. The meter section outlet 108 of FIG. 3 is disposed vertically within the component substrate 74 intermediately between the component first surface 68 and the substrate second surface 82. The meter section outlet 108 of FIG. 3 is thereby vertically recessed into the component substrate 74 by a vertical distance 110 (e.g., along the z-axis).

The longitudinal centerline 96 and its (e.g., entire) meter segment 106 of FIG. 3 are angularly offset from the component first surface 68 by an included angle 112. This meter segment angle 112 may be an acute angle, or a right angle. The meter segment angle 112, for example, may be between ten degrees (10°) and eighty degrees (80°); e.g., between twenty degrees (20°) and thirty degrees (30°).

The meter section 102 has a longitudinal length 114 measured along the meter segment 106 between the cooling aperture inlet 98 and the meter section outlet 108. The meter section 102 also has a vertical length 116 measured, for example, along a line perpendicular to the component first surface 68 (e.g., along the z-axis) between the cooling aperture inlet 98 and the meter section outlet 108.

Figure 4:
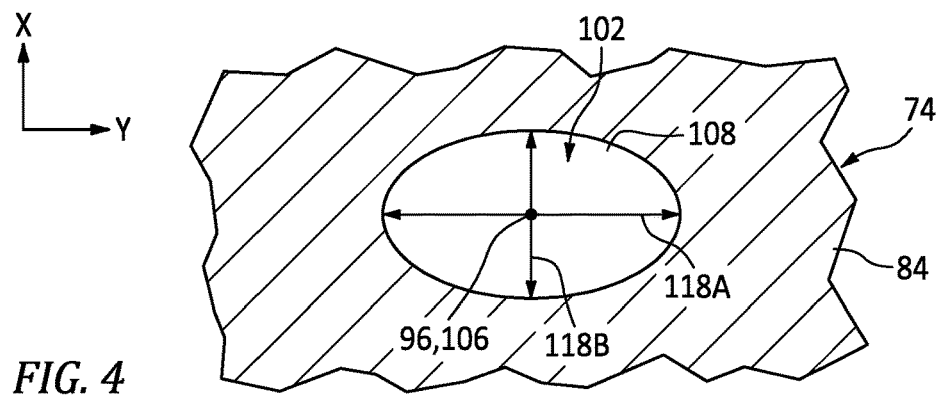
FIG. 4 is a cross-sectional illustration of a portion of the fluid cooled component at a meter section outlet of the cooling aperture.

Referring to FIG. 4, the meter section 102 has a first lateral width 118A (e.g., a major axis dimension; e.g., along the y-axis) and a second lateral width 118B (e.g., a minor axis dimension; e.g., along the x-axis). These lateral widths 118A and 118B (generally referred to as "118") may be measured, for example, along/within a plane parallel with the component first surface 68 and/or the component second surface 70 (see FIG. 3); e.g., the x-y plane. The first lateral width 118A of FIG. 4 is greater than the second lateral width 118B. However, in other embodiments, the first lateral width 118A may be equal to or less than the second lateral width 118B.

The meter section 102 has a cross-sectional geometry when viewed, for example, in a (e.g., x-y plane) plane parallel with the component first surface 68 and/or the component second surface 70 (see FIG. 3); e.g., the plane of FIG. 4. This meter section cross-sectional geometry may be uniform (e.g., remain constant) along the longitudinal length 114 of the meter section 102. The meter section cross-sectional geometry of FIG. 4 has a rounded shape. Examples of the rounded shape include, but are not limited to, an oval, an ellipse and a circle. The present disclosure, however, is not limited to the foregoing exemplary meter section cross-sectional geometry shapes.

The diffuser section 104 of FIG. 3 extends longitudinally along the longitudinal centerline 96 out of the component substrate 74, through the inner coating 76 and the outer coating 78. More particularly, the diffuser section 104 of FIG. 3 extends longitudinally along a diffuser segment 120 of the longitudinal centerline 96 (e.g., a centerline of the diffuser section 104) from an inlet 122 of the diffuser section 104 (here, also the meter section outlet 108), through the materials 84, 88 and 94, to the cooling aperture outlet 100. The diffuser section inlet 122 of FIG. 3 is disposed vertically within the component substrate 74 intermediately between the component first surface 68 and the substrate second surface 82. The diffuser section inlet 122 of FIG. 3 is thereby vertically recessed into the component substrate 74 by the vertical distance 110 (e.g., along the z-axis).

The longitudinal centerline 96 and its (e.g., entire) diffuser segment 120 of FIG. 3 are angularly offset from the component second surface 70 by an included angle 124. This diffuser segment angle 124 may be an acute angle. The diffuser segment angle 124, for example, may be between twenty degrees (20°) and eighty degrees (80°); e.g., between thirty-five degrees (35°) and fifty-five degrees (55°). The diffuser segment angle 124 of FIG. 3 is different (e.g., less) than the meter segment angle 112. The diffuser segment 120 may thereby be angularly offset from the meter segment 106.

The diffuser section 104 has a longitudinal length 126 measured along the diffuser segment 120 between the diffuser section inlet 122 and the cooling aperture outlet 100. This diffuser section longitudinal length 126 may be equal to or different (e.g., less or greater) than the meter section longitudinal length 114. The diffuser section 104 also has a vertical length 128 measured, for example, along a line perpendicular to the component first surface 68 or the second surface 70 (e.g., along the z-axis) between the diffuser section inlet 122 and the cooling aperture outlet 100. This diffuser section vertical length 128 may be equal to or different (e.g., less or greater) than the meter section vertical length 116.

Figure 5:
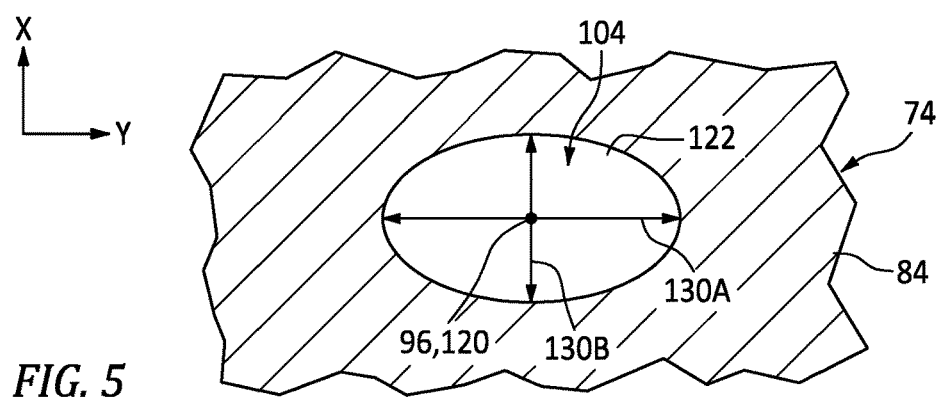
FIG. 5 is a cross-sectional illustration of a portion of the fluid cooled component at a diffuser section inlet of the cooling aperture.

Referring to FIG. 5, the diffuser section 104 has a first lateral width 130A (e.g., a major axis dimension; e.g., along the y-axis) and a second lateral width 130B (e.g., a minor axis dimension; e.g., along the x-axis). These lateral widths 130A and 130B (generally referred to as "130") may be measured, for example, along/within a plane parallel with the component first surface 68 and/or the component second surface 70 (see FIG. 3); e.g., the x-y plane. The first lateral width 130A of FIG. 5 is greater than the second lateral width 130B. However, in other embodiments, the first lateral width 130A may be equal to or less than the second lateral width 130B.

The first lateral width 130A and the corresponding first lateral width 118A (see FIG. 4) at an interface 132 (see FIG. 3) between the meter section 102 and the diffuser section 104 are equal. Similarly, the second lateral width 130B and the corresponding second lateral width 118B (see FIG. 4) at the interface 132 (see FIG. 3) between the meter section 102 and the diffuser section 104 are equal. However, the lateral widths 130 of the diffuser section 104 at other locations along the longitudinal centerline 96 may be greater the corresponding lateral widths 118 of the meter section 102 (see FIG. 4). More particularly, the diffuser section 104 of FIG. 3 (see also transition from FIG. 5 to FIG. 6) laterally diverges as the diffuser section 104 projects longitudinally away from the meter section 102 towards or to the cooling aperture outlet 100.

Referring to FIG. 5, the diffuser section 104 has a cross-sectional geometry when viewed, for example, in a plane parallel with the component first surface 68 and/or the component second surface 70 (see FIG. 3); e.g., the x-y plane. At the interface 132, the diffuser section cross-sectional geometry is the same as the meter section cross-sectional geometry (see FIG. 4). The diffuser section cross-sectional geometry of FIG. 5, for example, has a rounded shape. Examples of the rounded shape include, but are not limited to, an oval, an ellipse and a circle. The present disclosure, however, is not limited to the foregoing exemplary diffuser section cross-sectional geometry shapes.

Figure 6:
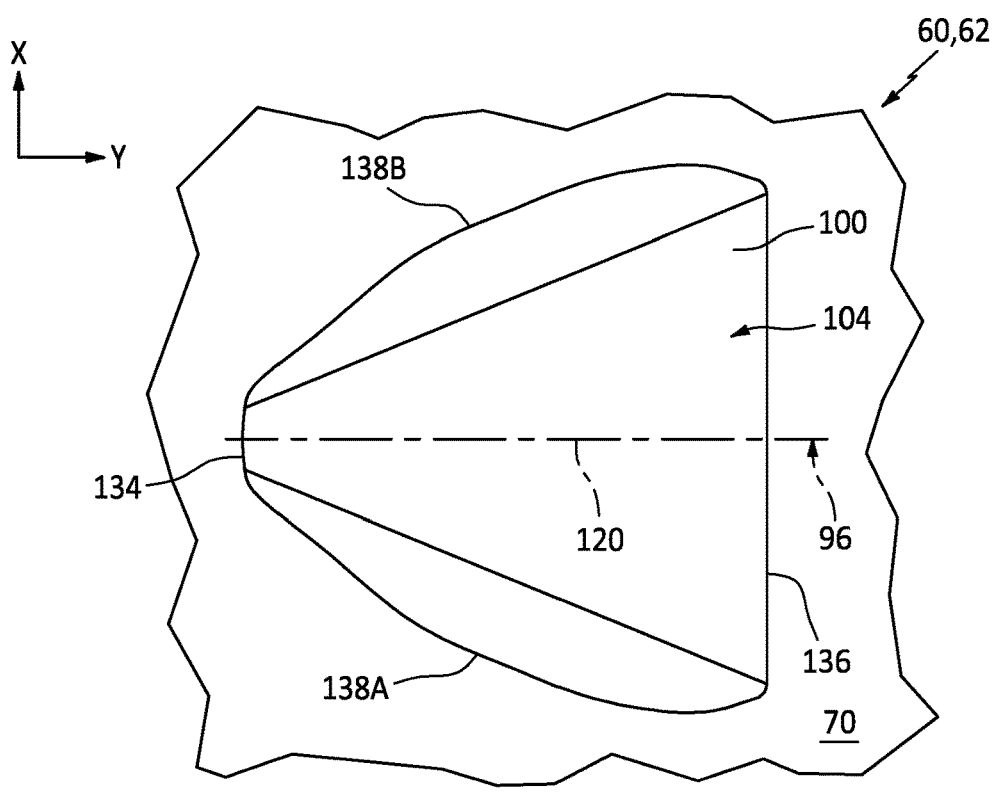
FIG. 6 is a side illustration of a portion of the fluid cooled component at an outlet of the cooling aperture and its diffuser section.

Referring to FIGS. 3, 5 and 6, a shape and/or dimensions of the diffuser section cross-sectional geometry change as the diffuser section 104 projects longitudinally away from the meter section 102, e.g. sequentially through the materials 84, 88 and 94 of FIG. 3, to the cooling aperture outlet 100. For example, at the cooling aperture outlet 100 of FIG. 6, the diffuser section cross-sectional geometry may have a complex shape when viewed, for example, in a plane parallel with the component first surface 68 and/or the component second surface 70; e.g., the x-y plane. This diffuser section cross-sectional geometry of FIG. 6 includes a (e.g., curved or straight) leading edge section 134, a (e.g., curved or straight) trailing edge section 136 and opposing (e.g., curved or straight; concave, convex and/or splined) sidewall sections 138A and 138B (generally referred to as "138"). Each of the sidewall sections 138 extends between and to respective ends of the leading and the trailing edge sections 134 and 136. A lateral width of the leading edge section 134 may be different (e.g., smaller) than a lateral width of the trailing edge section 136. The sidewall sections 138 may thereby generally laterally diverge away from one another as the sidewall sections 138 extend from the leading edge section 134 to the trailing edge section 136.

Figure 8:
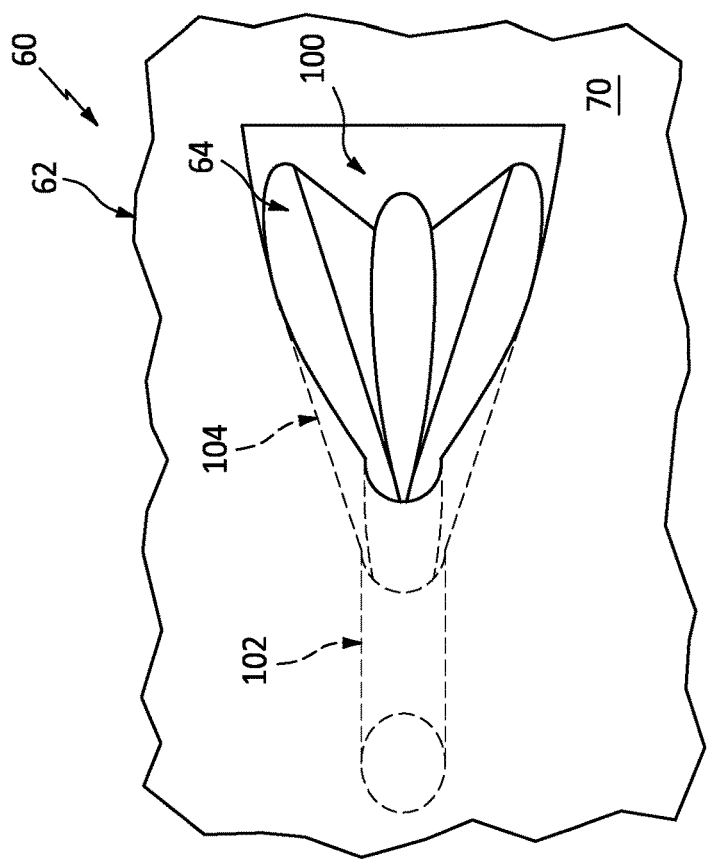
FIGS. 7 and 8 are side illustrations of portions of the fluid cooled component configured with various multi-lobed cooling apertures.
Figure 7:
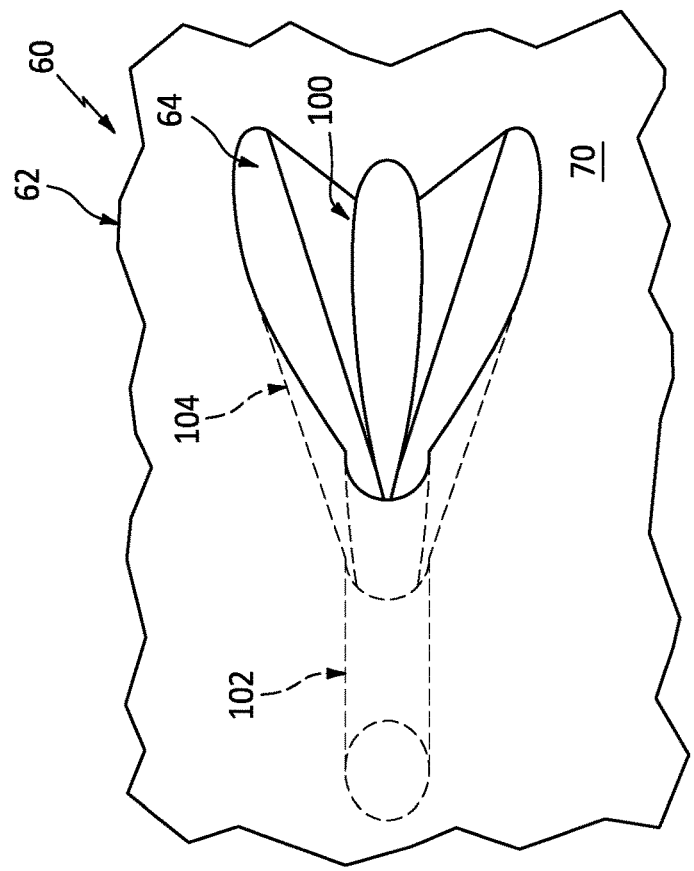

In some embodiments, referring to FIG. 6, the diffuser section 104 may be configured as a single lobe diffuser section. In other embodiments, referring to FIGS. 7 and 8, the diffuser section 104 may be configured as a multi-lobe diffuser section. Various other single lobe and multi-lobe diffuser sections for cooling apertures are known in the art, and the present disclosure is not limited to any particular ones thereof. Further details on various multi-lobe diffuser sections can be found in U.S. Pat. No. 9,598,979, which is assigned to the assignee of the present disclosure and hereby incorporated herein by reference in its entirety.

Figure 9:
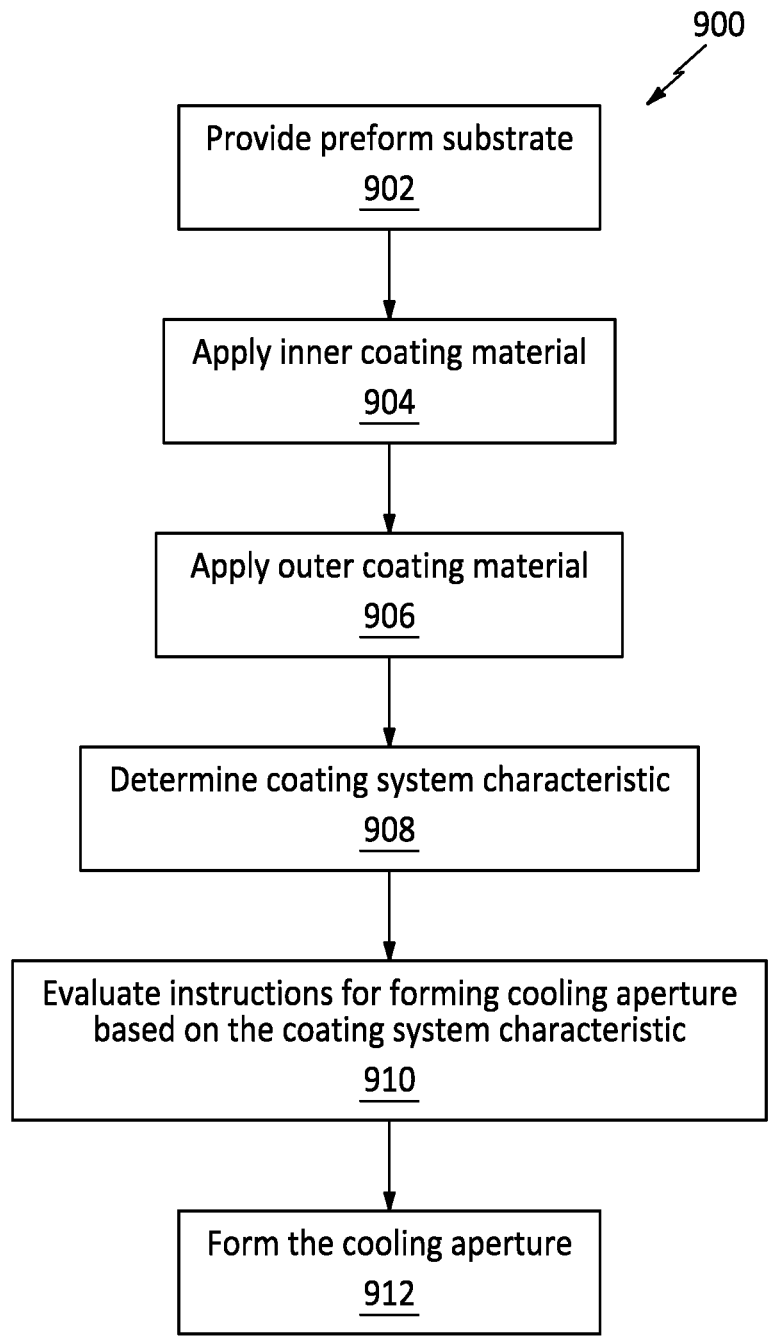
FIG. 9 is a flow diagram of a method for manufacturing a fluid cooled component.

FIG. 9 is a flow diagram of a method 900 for manufacturing a fluid cooled component. For ease of description, the method 900 is described below with reference to the fluid cooled component 60 described above. The method 900 of the present disclosure, however, is not limited to manufacturing such an exemplary fluid cooled component.

Figure 10:
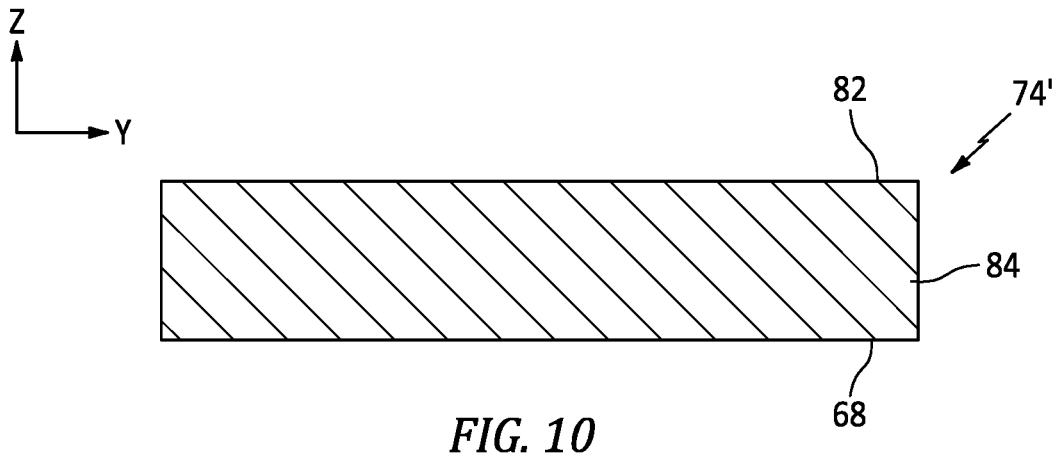
FIG. 10 is a sectional illustration of a portion of a preform substrate.

In step 902, a preform substrate 74' is provided. Referring to FIG. 10, the preform substrate 74' may generally have the configuration (e.g., shape, size, etc.) of the substrate 74 for the fluid cooled component 60 to be formed (e.g., see FIG. 3). The preform substrate 74' of FIG. 10, however, does not include any holes therein for forming the cooling apertures 64.

Figure 11:
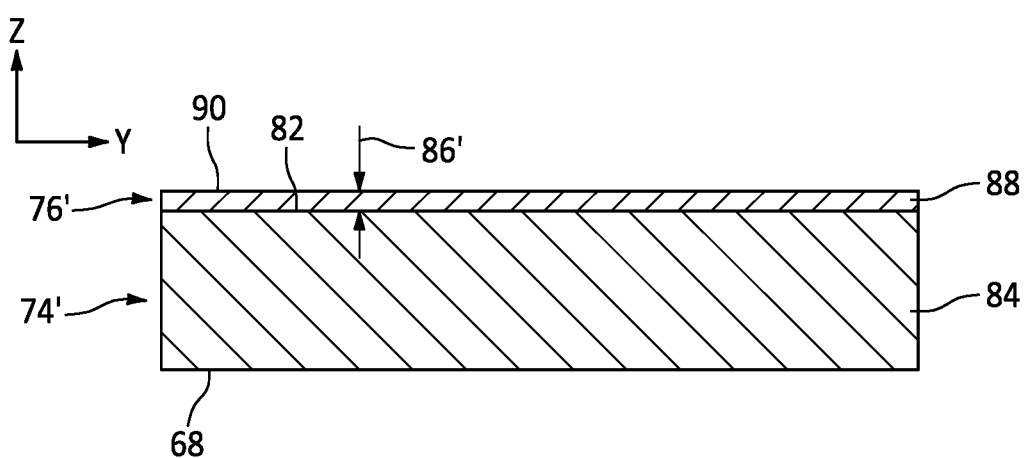
FIG. 11 is a sectional illustration of a portion of the preform substrate configured with a preform inner coating.

In step 904, a preform inner coating 76' is applied over the preform substrate 74'. For example, referring to FIG. 11, the inner coating material 88 may be applied (e.g., deposited) onto the second surface 82 of the preform substrate 74'. The inner coating material 88 may be applied using various inner coating application techniques. Examples of the inner coating application techniques include, but are not limited to, a physical vapor deposition (PVD) process, chemical vapor deposition (CVD) process, a plating process, and a thermal spray process (e.g., a plasma spray (PS) process, a high velocity oxygen fuel (HVOF) process, high velocity air fuel (HVAF) process, a wire spray process or a combustion spray process). The inner coating application may be performed via a non-line-of-sight (NLOS) coating process or a direct-line-of-sight (DLOS) coating process. The preform inner coating 76' of FIG. 11 may generally have the configuration of the inner coating 76 for the fluid cooled component 60 to be formed (e.g., see FIG. 3). The preform inner coating 76' of FIG. 11, however, does not include any holes for forming the cooling apertures 64.

Depending upon the specific inner coating application technique as well as application tolerances, the preform inner coating 76' may exhibit slight dimensional deviations from an inner coating specified in a design specification for the to-be-formed fluid cooled component 60 (see FIG. 3). For example, the inner coating material 88 may be applied slightly thicker in one or more areas than specified such that a vertical thickness 86' of the preform inner coating 76' at those one or more areas is slightly thicker than a vertical thickness of the design specification inner coating. The inner coating material 88 may be also or alternatively be applied slightly thinner in one or more areas than specified such that the vertical thickness 86' of the preform inner coating 76' at those one or more areas is slightly thinner than the vertical thickness of the design specification inner coating. Fluctuations in the preform inner coating thickness 86' may alter a topology of the second surface 90 from a corresponding topology in the design specification.

Figure 12:
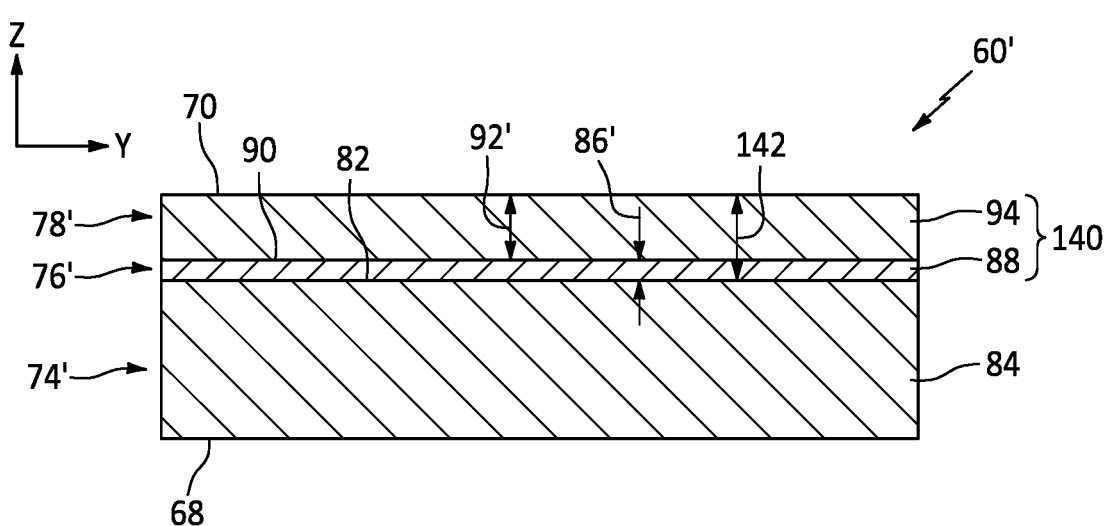
FIG. 12 is a sectional illustration of a portion of the preform substrate further configured with a preform outer coating.

In step 906, a preform outer coating 78' is applied over the preform substrate 74' and the preform inner coating 76'. For example, referring to FIG. 12, the outer coating material 94 may be applied (e.g., deposited) onto the second surface 90 of the preform inner coating 76'. The outer coating material 94 may be applied using various outer coating application techniques. Examples of the outer coating application techniques include, but are not limited to, a physical vapor deposition (PVD) process (e.g., an electron-beam PVD process), chemical vapor deposition (CVD) process, a thermal spray process (e.g., a plasma spray (PS) process, a high velocity oxygen fuel (HVOF) process, high velocity air fuel (HVAF) process, a wire spray process or a combustion spray process). The outer coating application may be performed via a non-line-of-sight (NLOS) coating process or a direct-line-of-sight (DLOS) coating process. The preform outer coating 78' of FIG. 12 may generally have the configuration of the outer coating 78 for the fluid cooled component 60 to be formed (e.g., see FIG. 3). The preform outer coating 78' of FIG. 12, however, does not include any holes for forming the cooling apertures 64.

Depending upon the specific outer coating application technique as well as application tolerances, the preform outer coating 78' may exhibit slight dimensional deviations from an outer coating specified in the design specification for the to-be-formed fluid cooled component 60 (see FIG. 3). For example, the outer coating material 94 may be applied slightly thicker in one or more areas than specified such that a vertical thickness 92' of the preform outer coating 78' at those one or more areas is slightly thicker than a vertical thickness of the design specification outer coating. The outer coating material 94 may be also or alternatively be applied slightly thinner in one or more areas than specified such that the vertical thickness 92' of the preform outer coating 78' at those one or more areas is slightly thinner than the vertical thickness of the design specification outer coating. Fluctuations in the preform outer coating thickness 92' may alter a topology of the component second surface 70 from a corresponding topology in the design specification.

The combination of the preform substrate 74', the preform inner coating 76' and the preform outer coating 78' may provide a preform component 60'. This preform component 60' of FIG. 12 may generally have the configuration of the fluid cooled component 60 to be formed (e.g., see FIG. 3). The preform component 60' of FIG. 12, however, does not include any holes for forming the cooling apertures 64. Furthermore, the preform inner coating 76' and the preform outer coating 78' may provide a coating system 140 for the preform component 60'.

In step 908, a characteristic of the coating system 140 is determined. For example, a characteristic (e.g., a structural feature) of the preform inner coating 76' and/or a characteristic (e.g., a structural feature) of the preform outer coating 78' is modeled, calculated, estimated, predicted and/or otherwise determined. An example of the preform inner coating characteristic is a parameter such as, but not limited to, an actual dimension (e.g., the thickness 86') of the inner coating material 88 applied onto the preform substrate 74' at one or more locations (e.g., along the x-y plane). Examples of the preform outer coating characteristic include parameters such as, but not limited to: an actual dimension (e.g., the thickness 92') of the outer coating material 94 applied over the preform substrate 74' (e.g., onto the preform inner coating 76') at one or more locations (e.g., along the x-y plane); and a surface topology of the outer coating material 94 (e.g., the actual surface topology of the component second surface 70).

The characteristic(s) may be determined by modeling the application of the coating material(s) 88, 94. For example, a processing system (e.g., a computer system) may computationally model one or more of the external preform coatings 76', 78' over the preform substrate 74' (prior to or following application of those coatings 76', 78') to predict a geometry of the preform component 60'. More particularly, the processing system may model predicted changes in the external preform coatings 76', 78' over the preform substrate 74' due to, for example, manufacturing tolerances, etc. This modeling may be performed using artificial intelligence (AI). The modeling may also or alternatively be performed using machine learning where, for example, information learned/acquired from manufacturing one or more previous fluid cooled components 60 may be applied to manufacturing of the present fluid cooled component 60.

The characteristic(s) may also or alternatively be determined using an optical imaging system. This imaging system may include an optical sensor system (e.g., a light source and a camera) for visually obtaining information on a part being scanned. For example, prior to being coated with the coating materials 88 and 94, at least a portion or an entirety of the second surface 82 of the preform substrate 74' of FIG. 10 may be scanned to provide first scan data. This first scan data may be indicative of dimensions and/or a topology of the second surface 82 of the preform substrate 74'. Following the application of the outer coating material 94 of FIG. 12, at least a portion or an entirety of the second surface 70 of the preform component 60' may be scanned to provide second scan data. This second scan data may be indicative of dimensions and/or a topology of the second surface 70 of the preform component 60'. The processing system may compare the second scan data with the first scan data to determine, for example, an overall dimension (e.g., thickness 142) of the coating system 140 at one or more locations. Of course, this may also or alternatively be performed for the preform coating(s) 76', 78'.

The characteristic(s) may also or alternatively be determined using a non-contact, non-destructive imaging system. This imaging system may use electromagnetic waves to scan an internal structure of the preform component 60'. The imaging system, for example, may be configured as a computerized tomography (CT) imaging system or a microwave imaging system. With such a configuration, the imaging system may transmit electromagnetic waves into the preform component 60'. These electromagnetic waves may be selected/tuned based on the material composition of the preform component 60'. For example, the electromagnetic waves may be selected to travel through portions (certain component materials) of the preform component 60'. However, the electromagnetic waves may be selected to reflect against other portions (certain component materials) of the preform component 60'. At least some of the reflected electromagnetic waves may travel back to and may be received by the imaging system. Data associated with the reflected electromagnetic waves may be processed to determine dimension(s) of the coatings (e.g., the coating system thickness 142, etc.) and/or a topology of the second surface 70 of the preform component 60'.

Figure 13:
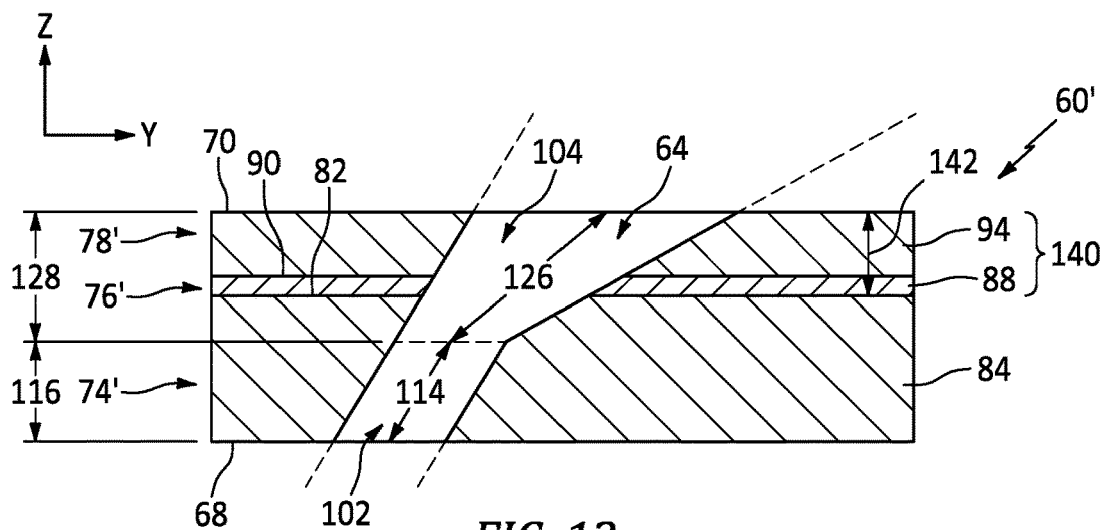
FIGS. 13 and 14 are sectional illustrations of a portion of a preform component configured with cooling apertures having different design specifications.
Figure 14:
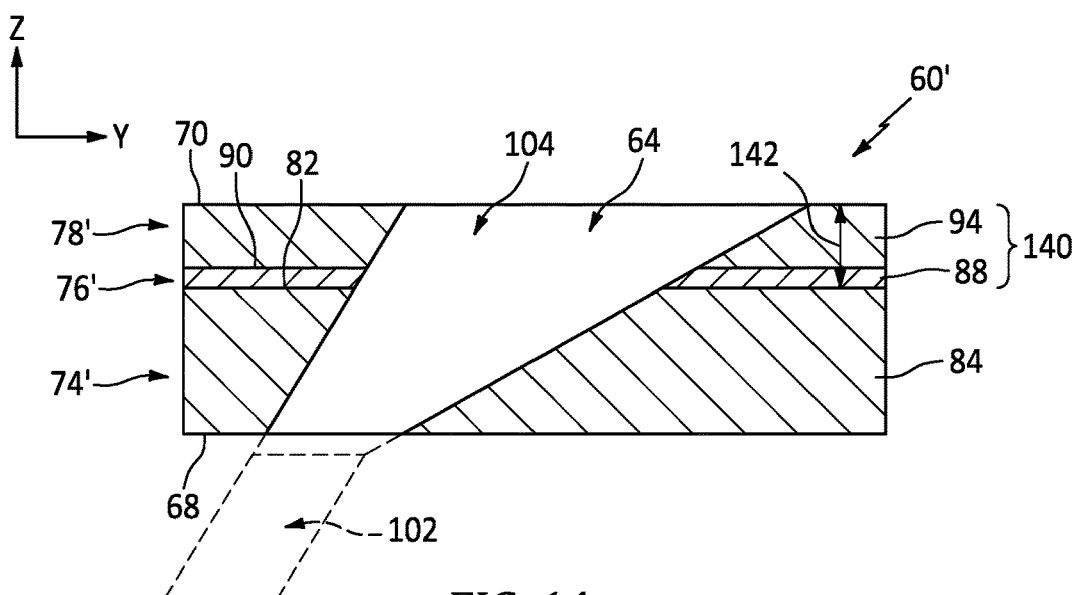

In step 910, instructions for forming a cooling aperture 64 in the preform component 60' are evaluated. The processing system, for example, may compare the characteristic(s) determined during the step 908 with corresponding characteristic(s) from the design specification. Where the determined characteristic(s) are the same as (or within a certain threshold of) the corresponding design specification characteristic(s), then the instructions may be used (as-is) for forming the cooling aperture 64 without any changes (e.g., revisions, modifications). However, where the determined characteristic(s) are different than (or outside a certain threshold of) the corresponding design specification characteristic(s), then the instructions may be changed (e.g., revised, modified, adapted) to provide revised instructions. For example, referring to FIG. 13, where an overall dimension (e.g., thickness 142) of the coating system 140 is thinner than specified in the design specification, a dimension (e.g., the vertical length 116 and/or the longitudinal length 114) of the meter section 102 may be changed (e.g., shortened) and/or a dimension (e.g., the vertical length 128 and/or the longitudinal length 126) of the diffuser section 104 may be changed (e.g., shortened). This may ensure, for example, the cooling aperture 64 includes a certain length (e.g., a threshold length 114) of the meter section 102. By contrast, if the design specification cooling aperture were formed in a too thin of a preform component 60' without modification to the design specification, the cooling aperture 64 could be formed without (or with a minimal length of) the meter section 102 as shown, for example, in FIG. 14.

Figure 15:
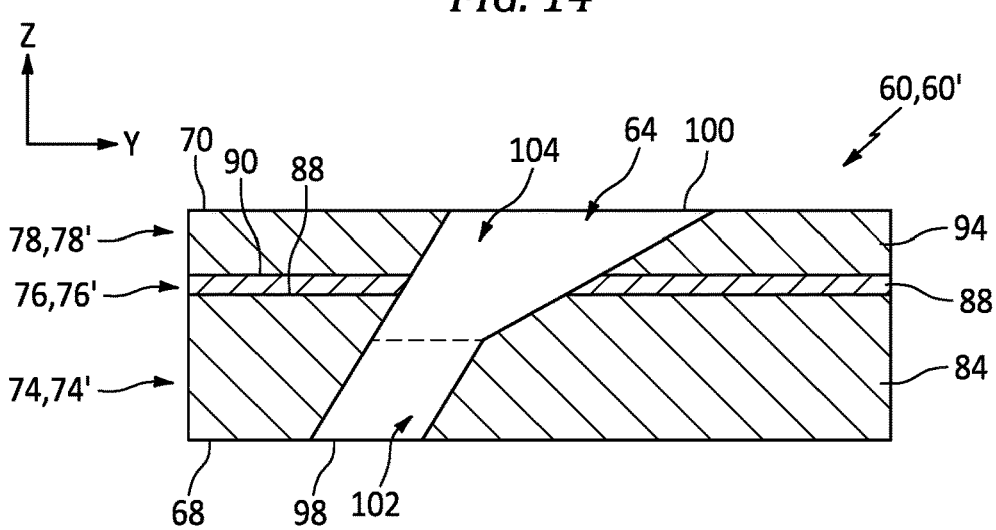
FIG. 15 is a sectional illustration of a portion of the preform substrate configured with a cooling aperture formed therein.

In step 912, the cooling aperture 64 is formed in the preform component 60'; e.g., see FIG. 15. Where the determined characteristic(s) are the same as (or within a certain threshold of) the corresponding design specification characteristic(s), then the cooling aperture 64 may be formed according to the original (e.g., unchanged) instructions. However, where the determined characteristic(s) are different than (or outside a certain threshold of) the corresponding design specification characteristic(s), then the cooling aperture 64 may be formed according to the changed (e.g., revised, modified, adapted) instructions.

The cooling aperture 64 and its various sections may be formed using a single machining process. Alternatively, different sections of the cooling aperture 64 may be formed using different machining processes. For example, the diffuser section 104 may be formed in the materials 94, 88 and 84 using a first machining process such as a laser machining (e.g., ablation) process, a water-jet guided laser (WJGL) machining process, an abrasive water jet (AWJ) machining process, an electron beam machining process, and a mechanical drilling process. The meter section 102 may then be formed in the substrate material 84 using a second machining process such as an electrical discharge machining (EDM) process. In another example, both the diffuser section 104 and the meter section 102 may be formed using an energy (e.g., laser or electron) beam machining process; however, the energy beam source may be different and/or an intensity of the energy beam may be different. The present disclosure, however, is not limited to any particular formation processes. For example, the meter section 102 may alternatively be formed using a laser machining (e.g., ablation) process, a water-jet guided laser (WJGL) machining process, an abrasive water jet (AWJ) machining process, an electron beam machining process, and a mechanical drilling process. Following this formation step 912, the preform component 60' may now be the fully formed fluid cooled component 60.

The method 900 is described above as changing a dimension for the diffuser section 104 and/or the meter section 102 in the instructions for forming the cooling aperture 64. However, the method 900 may also or alternatively change various other parameters in the instructions. For example, the method 900 may change a geometry (e.g., cross-sectional shape and/or size) of the cooling aperture 64 and/or one or more of its sections 102, 104. The method 900 may also or alternatively change a spatial orientation of the cooling aperture 64 and/or one or more of its sections 102, 104, for example, to account for a varied surface topology.

For ease of description, the method 900 is described above with respect to formation of a single cooling aperture 64 of the fluid cooled component 60. However, the fluid cooled component 60 may be formed with multiple of the cooling apertures 64, for example, by repeating the formation step 912 at multiple locations along the preform component 60'. Note, the instructions for forming these additional cooling apertures 64 may be collectively changed in a similar manner. Alternatively, the instructions may be varied for one or more groupings of the cooling apertures 64 as needed. Still alternatively, the instructions may be varied for each individual cooling aperture 64 as needed.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A manufacturing method, comprising:
   providing a preform component for a turbine engine, the preform component comprising a substrate;
   providing instructions for forming a cooling aperture;
   applying an outer coating over the substrate;
   determining a characteristic of the outer coating;
   revising the instructions for forming the cooling aperture based on the characteristic of the outer coating to provide revised instructions; and
   forming the cooling aperture in the outer coating and the substrate based on the revised instructions, the cooling aperture including a diffuser section and a meter section, the diffuser section formed during the forming of the cooling aperture at least in the outer coating, and the meter section formed during the forming of the cooling aperture in the substrate.

2. The manufacturing method of claim 1, wherein the characteristic of the outer coating comprises a thickness of the outer coating.

3. The manufacturing method of claim 1, wherein the characteristic of the outer coating comprises a surface topology of the outer coating.

4. The manufacturing method of claim 1, wherein
   the instructions specify a dimension of the diffuser section to have a first value; and
   the revised instructions specify the dimension of the diffuser section to have a second value that is different than the first value.

5. The manufacturing method of claim 1, wherein
   the instructions specify a dimension of the meter section to have a first value; and
   the revised instructions specify the dimension of the meter section to have a second value that is different than the first value.

6. The manufacturing method of claim 1, wherein at least a portion of the diffuser section and at least a portion of the meter section are formed using a common machining process.

7. The manufacturing method of claim 1, wherein
   at least a portion of the diffuser section is formed using a first machining process; and
   at least a portion of the meter section is formed using a second machining process that is different than the first machining process.

8. The manufacturing method of claim 1, wherein the characteristic of the outer coating is determined using artificial intelligence.

9. The manufacturing method of claim 1, wherein the characteristic of the outer coating is determined using machine learning.

10. The manufacturing method of claim 1, further comprising:
    scanning the substrate using an imaging system to provide substrate data prior to the applying of the outer coating; and
    scanning the outer coating using the imaging system to provide outer coating data;
    wherein the determining of the characteristic of the outer coating comprises comparing the coating data with the substrate data.

11. The manufacturing method of claim 1, wherein the determining of the characteristic of the outer coating comprises scanning the outer coating with an imaging system to determine an internal structural feature of the outer coating.

12. The manufacturing method of claim 1, wherein the preform component comprises a preform of an airfoil for the turbine engine.

13. The manufacturing method of claim 1, wherein the preform component comprises a preform of a flowpath wall for the turbine engine.

14. A manufacturing method, comprising:
    providing a preform component for a turbine engine, the preform component comprising a substrate;
    providing a design specification for a cooling aperture;
    applying an outer coating over the substrate;
    adapting the design specification for the cooling aperture based on a characteristic of the outer coating to provide an adapted design specification; and
    forming the cooling aperture in the outer coating and the substrate based on the adapted design specification, wherein a meter section of the cooling aperture is formed in the substrate after the outer coating is applied over the substrate.

15. The manufacturing method of claim 14, wherein the adapting of the design specification changes a value of a dimension for the cooling aperture.

16. The manufacturing method of claim 14, wherein the adapting of the design specification changes a geometry of the cooling aperture.

17. The manufacturing method of claim 14, wherein the adapting of the design specification changes a spatial orientation of the cooling aperture.

18. The manufacturing method of claim 14, further comprising determining the characteristic of the outer coating using at least one of artificial intelligence, machine learning or an imaging system.

19. A manufacturing method, comprising:
    providing a preform component for a turbine engine, the preform component comprising a substrate;
    providing instructions for forming a diffuser section of a cooling aperture;

applying an outer coating over the substrate;
determining a thickness of the outer coating applied over the substrate;
adapting the instructions for forming the diffuser section of a cooling aperture based on the thickness of the outer coating to provide revised instructions; and
forming an entirety of the cooling aperture in at least the substrate and the outer coating after the outer coating is applied over the substrate, the forming of the cooling aperture comprising forming the diffuser section of the cooling aperture at least in the outer coating based on the revised instructions.

\* \* \* \* \*